United States Patent Office 3,423,447
Patented Jan. 21, 1969

3,423,447
PROCESS FOR PREPARING AROMATIC MONOISOCYANATES
Donald D. Carlos, Crown Point, Ind., and Emmett H. Burk, Jr., Glenwood, Ill., assignors to Sinclair Research, Inc., New York, N.Y., a corporation of Delaware
No Drawing. Filed Oct. 22, 1965, Ser. No. 502,345
U.S. Cl. 260—453    4 Claims
Int. Cl. C07c 119/04; C07d 95/00

ABSTRACT OF THE DISCLOSURE

Aromatic monoisocyanates are prepared by subjecting to thermal decomposition aromatic mono(nitrile sulfites) which are essentially free of chlorine-containing impurities and which correspond to the general formula:

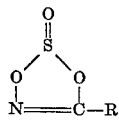

wherein R is an aromatic hydrocarbon radical of 1 to 3 aromatic hydrocarbon rings and up to about 20 carbon atoms.

---

The present invention is directed to a process for the production of aromatic monoisocyanates. More specifically, the invention is directed to the production of aromatic monoisocyanates by the thermal decomposition of essentially chlorine-free aromatic mono(nitrile sulfites).

The aromatic mono(nitrile sulfites) which decompose to the corresponding aromatic monoisocyanates in accordance with the process of the present invention can be represented by the following structure:

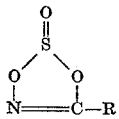

wherein R is an aromatic hydrocarbon of 1 to 3 aromatic hydrocarbon rings often of 6 to about 20 carbon atoms, preferably 6 to about 10 carbon atoms. The aromatic hydrocarbon, R, in the above structure, can also be substituted with non-interfering groups. The nitrile sulfite group of the compounds of the present invention is attached to one of the aromatic rings of the aromatic hydrocarbon R. The aromatic mono(nitrile sulfite) feeds of the invention include mono(nitrile sulfites) of, for instance, benzene, toluene, naphthalene, anthracene, phenylbenzene, phenylnaphthalene, diphenylalkylenes such as diphenylmethylene, diphenylethylene (stilbene), etc., dinaphthylalkylene and the like aromatic hydrocarbons.

Aromatic mono(nitrile sulfites) that can be used as the feed in the method of the present invention can be prepared for instance by the method described in copending application Ser. No. 502,348 to Emmett H. Burk and Donald D. Carlos, filed concurrently herewith and now abandoned. Illustrative of suitable feeds are the mono-(nitrile sulfite) of alkylated benzenes such as tolylnitrile sulfite, xylylnitrile sulfite, trimethylbenzonitrile sulfite, ethylbenzonitrile sulfite, hexylbenzonitrile sulfite, nonylbenzonitrile sulfite, dodecylbenzonitrile sulfite, pentadecylbenzonitrile sulfite, tricosylbenzonitrile sulfite; naphthomono(nitrile sulfites), such as 8-naphthonitrile sulfite, cyclohexylnitrile sulfite, tetrahydronaphthonitrile sulfite, 1-chloro-4-benzonitrile sulfite, 4 bromo-1-benzonitrile sulfite, 3-nitrobenzonitrile sulfite, anthracene mono(nitrile sulfite); biphenyl mono(nitrile sulfites), such as 1-phenyl-4-benzonitrile sulfite, 1-benzyl-4-benzonitrile sulfite, 1-phenylethyl-4-benzonitrile sulfite and the like.

Decomposition of the aromatic mono(nitrile sulfite) to the corresponding aromatic monoisocyanate can be effected by heating the aromatic mono(nitrile sulfite) to a temperature below the degradation point of the desired aromatic monoisocyanate product. Since the decomposition reaction is exothermic there may be a tendency for the reaction temperature to run away. Means for carrying away or absorbing heat may be used, therefore, to control the temperature below the degradation point of the desired aromatic isocyanate product. The temperature employed will vary, of course, depending upon the decomposition temperature of the feed and degradation temperature of the particular aromatic isocyanates being prepared. In most cases, however, temperature will usually fall in the range of about 50 to 200° C., preferably about 75 to 150° C. Advantageously, the decomposition is conducted in the presence of an inert solvent such as benzene, xylenes, toluene, chlorobenzene and the like or in excess thionyl chloride.

The ability of the aromatic mono(nitrile sulfites) to generate isocyanates upon heating provides an additional advantage to the consumer in that the aromatic mono-(nitrile sulfites), in contrast to isocyantes, are stable in the absence of water and therefore can be easily handled and stored. Also, since there is no active hydrogen (e.g., in the form of HCl), present in the aromatic mono(nitrile sulfites) or in the decomposition products formed, to react with the isocyanate when the latter is made, use of the aromatic mono(nitrile sulfites) for the production of monoisocyanates provides a method that does not suffer from the reduced yields and separation and purification problems presented by the byproducts obtained from starting materials of commercial methods wherein active hydrogen is present. Use of the aromatic mono(nitrile sulfites) in the preparation of isocyanates, furthermore, provides a process having advantages over commercial methods employing azides in that the former do not have the explosion tendencies of the latter and are more economical.

The aromatic mono(nitrile sulfites) can be prepared by reacting an aromatic monohydroxamic acid and thionyl chloride. Aromatic monohydroxamic acids which react with thionyl chloride to produce the novel compounds of the invention can be represented by the structure:

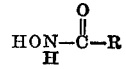

wherein R is as defined above in the structure of the aromatic mono(nitrile sulfite). Thus, the aromatic hydroxamic acid reactants include, for instance, benzomonohydroxamic acids, naphthomonohydroxamic acids, anthromonohydroxamic acids, phenylbenzomonohydroxamic acids, phenylnaphthomonohydroxamic acid, diphenylalkylene monohydroxamic acids and dinaphthylalkylene polyhydroxamic acids. The aromatic hydrocarbon R of the monohydroxamic acid structure can be substituted, if desired, so long as the substituents do not inhibit formation of the mono(nitrile sulfites) of the invention.

Illustrative of aromatic monohydroxamic acids suitable for use as the reactant in the preparation of the aromatic mono(nitrile sulfites) are the following: benzohydroxamic acids, the hydroxamic acids of alkylated benzenes such as tolylhydroxamic acid, xylylhydroxamic acid, trimethylbenzohydroxamic acid, ethylbenzohydroxamic acid, hexylbenzohydroxamic acid, nonylbenzohydroxamic acid, dodecylbenzohydroxamic acid, pentadecylbenzohydroxamic acid, tricosylbenzohydroxamic acid, naphthomonohydroxamic acids, such as 8-naphthohydroxamic acid, cyclohexylbenzohydroxamic acid, tetrahydronaphthohydroxamic acid, 1-chloro-4-benzohydroxamic acid, 4-bromo-1-benzohydroxamic acid, 3-nitrobenzohydroxamic acid, anthracenemonohydroxamic acids, biphenylmonohydroxamic acids such as 1-phenyl-4-benzohydroxamic acid, 1-benzyl-4-benzohydroxamic acid, 1-phenylethyl-4-benzohydroxamic acid and the like.

The temperature for effecting the reaction of the aromatic hydroxamic acid and thionyl chloride may vary depending upon the particular aromatic monohydroxamic acid selected but in all cases should be conducted below the decomposition temperature of the desired aromatic nitrile sulfite. Reflux temperatures can also be used as long as the reflux temperature of the particular mixture is below the decomposition temperature of the corresponding aromatic nitrile sulfite produced. The reaction temperature will often fall in the range of up to about 90° C., preferably up to about 50° C. The reaction has been successfully run at temperatures as low as about minus 30° C. Ordinarily the reaction will proceed readily at atmospheric pressure but sub- and superatmospheric pressure can be employed if desired.

Either the monohydroxamic acid reactant or the thionyl chloride reactant can be in excess but it is preferred that at least a stoichiometric amount of thionyl chloride be used, that is, a ratio of at least one mole of thionyl chloride per hydroxamic acid substituent. A large excess of thionyl chloride is particularly preferred. The reaction can be conducted in the liquid phase and in many cases the aromatic mono(hydroxamic acid) will react from the solid state. Advantageously the aromatic monohydroxamic acid is first dissolved or slurried in an oxygen-containing organic solvent.

Illustrative of suitable oxygen-containing solvents are the thionyl chloride reactant itself and normally liquid organic ethers, esters, furans, dioxanes and the like. The preferred solvent is the thionyl chloride reactant, an excess of which will partially dissolve the aromatic monohydroxamic acid.

The reaction is often over in less than about 0.5 hour, for example, 15 minutes or in about 5 to 20 hours, depending upon the reaction temperature employed and is marked by a cession in hydrogen chloride gas evolution. Normally at least about 0.5 hour is required for the reaction to go to completion at temperatures which minimize side reactions. The reaction is usually quite rapid as the aromatic monohydroxamic acid is dissolved. At the lower reaction temperatures the aromatic monohydroxamic acid is generally slow to dissolve and may even come out of solution, go back into solution, etc., during the reaction.

The aromatic mono(nitrile sulfite) can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the aromatic nitrile sulfite as a crude product. Alternatively, prior to the filtering step, the solution can be cooled to crystallize out the product which is then recovered as described. The crude product, which can be either crystalline or liquid depending on the particular aromatic mono(nitrile sulfite) prepared, contains small amounts of impurities having a high chlorine content. The feed decomposed in accordance with the present invention, that is, essentially chlorine-free aromatic mono(nitrile sulfite), can be obtained by recrystallization techniques as, for instance, from a suitable solvent such as dichloromethane, carbon disulfied, ethyl acetate, thionyl chloride and the like or mixtures thereof.

A convenient alternative method for obtaining an essentially chlorine-free aromatic mono(nitrile sulfite) is by extraction or washing with a hydrocarbon solvent. Any normally liquid hydrocarbon solvent can be used for the extraction as, for instance, alkanes of 5 to 15 or more carbon atoms, aromatics solvents such as benzene, xylenes, toluene, chlorobenzene and the like. A minimum amount of solvent is employed in the extraction, the actual amount used being dependent upon the particular aromatic mono (nitrile sulfite) feed selected. If desired, a combination of both the recrystallization and extraction methods can be used to obtain essentially chlorine-free aromatic mono (nitrile sulfite). Thermal decomposition of the essentially chlorine-free feed in accordance with the method of the present invention results in improved yields of a purer isocyanate product, which is also essentially chlorine-free.

The following examples are included to further illustrate the present invention.

EXAMPLE I

To a 300 cc. fluted, round bottom flask equipped with a reflux condenser attached to a $CaCl_2$ drying tube, were added 12.9 g. (.094 mole) of a benzohydroxamic acid and 100 cc. anhydrous ether. To the rapidly stirred slurry was added 12.3 g. (0.103 mole) of thionyl chloride dropwise. The reaction mixture was heated to 34° C. for one hour. The resulting solution was filtered and the solvents removed under reduced pressure. There resulted a quantitative yield of crude benzonitrile sulfite which upon recrystallization from pentane gave chlorine-free white crystals, M.P. 37–38° C.

*Analysis.*—Calculated: C, 45.91%; H, 2.73%; N, 7.65%; S, 17.48%. Found: C, 46.22%; H, 2.90%; N; S, 17.10%.

The infrared spectrum (Nujol mull) of the recrystallized material showed significant absorption at 6.24 microns, characteristic of a conjugated C=N stretching vibration, and a significant band in the 8.03 micron region characteristic of cyclic sulfites.

To a one liter flask equipped with stirrer and condenser is added at room temperature, 350 g. of chlorobenzene and 59 g. of chlorine-free benzonitrile sulfite thus prepared. The heterogeneous mixture is warmed slowly to dissolve the sulfite and the heating continued up to approximately 95° C. On completion of the reaction sulfur dioxide is removed at reduced pressure and a chlorobenzene-benzoisocyanate fraction collected. Distillation of the fraction provides chlorine-free benzoisocyanate (i.e., phenyl isocyanate).

EXAMPLE II

In accordance with the procedure of Example I, 50 g. (0.30 mole) of p-methoxybenzohydroxamic acid were treated with 372 g. (3.12 moles) of thionyl chloride for one hour at 27° C. There resulted a quantitative yield of crude, oily p-methoxybenzonitrile sulfite which upon trituration with an ether-pentane mixture gave a chlorine-free solid, M.P. 40–44° C.

The infrared spectrum (Nujol mull) of the solid was determined and showed the typical nitrile sulfite absorptions.

Decomposition of the thus prepared sulfite in chlorobenzene as in Example I provides chlorine-free p-methoxybenzoisocyanate.

EXAMPLE III

In a similar manner, 50.0 g. (0.274 mole) of p-nitrobenzohydroxamic acid was treated with 330 g. (2.77 moles) of thionyl chloride for four hours at a maximum temperature of 35° C. There was obtained a quantitative yield of crude p-nitrobenzonitrile sulfite which upon trituration with pentane gave a chlorine-free white solid, M.P. 126–127° C. (dec.).

The infrared spectrum (Nujol mull) of the material showed the significant C=N stretching vibration in the 6.25 micron region and a bond at 8.0 microns characteristic of cyclic sulfites.

Decomposition of the thus prepared sulfite in chlorobenzene as in Example I provides chlorine-free p-nitrobenzoisocyanate.

EXAMPLE IV

In like fashion, 49.7 g. (0.273 mole) of m-nitrobenzohydroxamic were treated with 330 g. (2.77 moles) of thionyl chloride for an hour and a quarter at a maximum temperature of 44° C. There was obtained a quantitative yield of crude m-nitrobenzonitrile sulfite which upon trituration with pentane gave a solid, M.P. 68–71° C.

The infrared spectrum (Nujol mull) of the material showed the characteristic nitrile sulfite stretching vibrations.

Decomposition of the thus perpared sulfite in chlorobenzene as in Example I provides chlorine-free m-nitrobenzoisocyanate.

It is claimed:

1. A process for the production of aromatic monoisocyanates which consists essentially of subjecting to thermal decomposition, at a temperature below the degradation point of the desired isocyanate, a compound which is essentially free of chlorine-containing impurities and which has the structure:

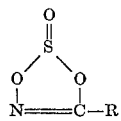

wherein R is an aromatic hydrocarbon of 1 to 3 aromatic hydrocarbon rings and 6 to about 20 carbon atoms.

2. A process for preparing aromatic monoisocyanate which consists essentially of subjecting to thermal decomposition, at a temperature below the degradation point of the desired isocyanate, a compound which is essentially free of chlorine-containing impurities and which has the structure:

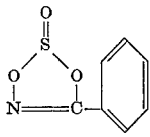

3. A method for the preparation of aromatic monoisocyanates which consists essentially of reacting thionyl chloride and an aromatic monohydroxamic acid having the structure:

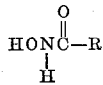

wherein R is an aromatic hydrocarbon of 1 to 3 aromatic hydrocarbon rings and 6 to about 20 carbon atoms, separating from the resulting reaction product mixture an aromatic mono(nitrile sulfite) which is essentially free of chlorine-containing impurities and which has the structure:

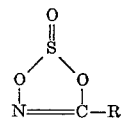

wherein R corresponds to that of said aromatic monohydroxamic acid and subjecting said aromatic mono(nitrile sulfite) to thermal decomposition, at a temperature below the degradation point of the desired isocyanate, to provide the corresponding aromatic monoisocyanate.

4. The process of claim 3 wherein the aromatic mono (nitrile sulfite) has the structure:

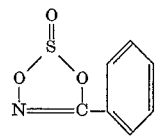

References Cited

UNITED STATES PATENTS

| 2,394,597 | 2/1946 | Dickey et al. | 260—453 |
| 3,238,220 | 3/1966 | Boshagen | 260—301 XR |
| 3,268,542 | 8/1966 | Burk et al. | 260—453 XR |

OTHER REFERENCES

Marquis: Compt. Rend. 143, 1163–1165 (1906).

CHARLES B. PARKER, *Primary Examiner.*

DOLPH H. TORRENCE, *Assistant Examiner.*

U.S. Cl. X.R.

260—301